Oct. 19, 1965    L. J. DREYLING ET AL    3,213,166
METHOD OF PRODUCING LIGHT WEIGHT HIGH
TEMPERATURE REFRACTORY PRODUCTS
Original Filed May 6, 1960
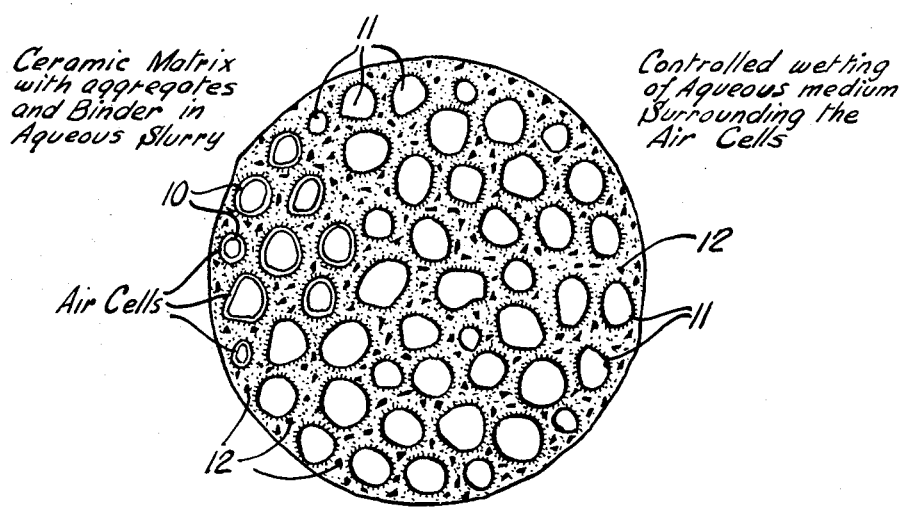
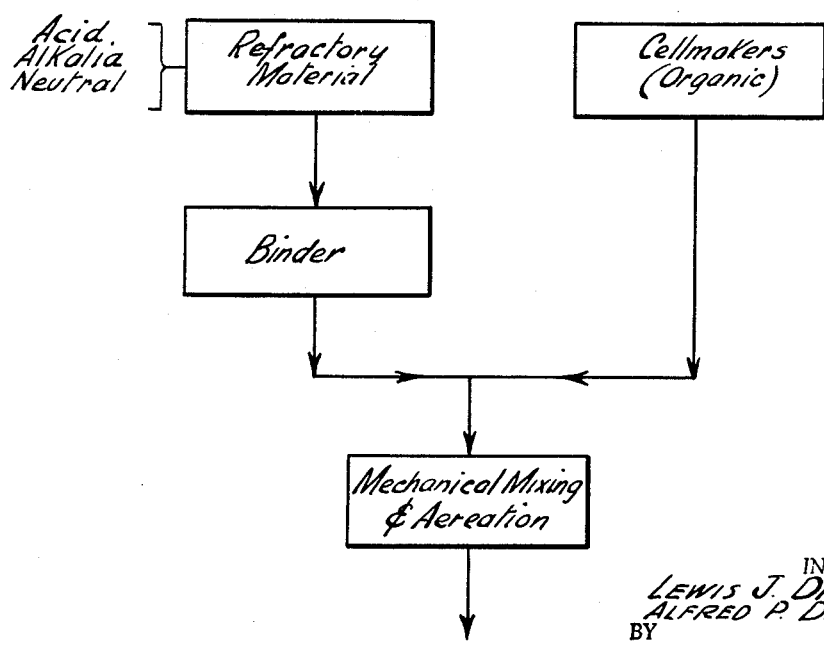
INVENTORS
LEWIS J. DREYLING
ALFRED P. DREYLING
BY
Morrison Kennedy & Campbell
ATTORNEYS

United States Patent Office 3,213,166
Patented Oct. 19, 1965

3,213,166
METHOD OF PRODUCING LIGHT WEIGHT HIGH TEMPERATURE REFRACTORY PRODUCTS
Lewis J. Dreyling, East Brunswick, and Alfred P. Dreyling, Freehold, N.J., assignors to Quigley Company, Inc., a corporation of New York
Original application May 6, 1960, Ser. No. 27,366, now Patent No. 3,141,781, dated July 21, 1964. Divided and this application Apr. 27, 1964, Ser. No. 362,855
2 Claims. (Cl. 264—44)

This application is a division of application Serial No. 27,366, filed May 6, 1960, now Patent No. 3,141,781, dated July 21, 1964.

This invention relates to the method of producing light weight refractories or light weight castable products capable of resisting high temperatures and having low shrinkage factors.

The trouble encountered in the past has been the inability to use an air dispersing agent that will produce an even dispersion of air throughout the mix. It is this inability to produce the even dispersion of air cells in the mix which affects the insulating properties of said mix, in that the insulating properties are lost since there is more or less freedom in air passage through the ceramic mass due to the character of the voids developed. This loss of insulating properties is due mainly to the cells as such fusing one into the other. The high insulating properties are due therefore to high even air dispersion resulting in low actual porosity and this is only possible by the presence of dead air in the form of discrete and individual spherical cells.

The normal air dispersing or foaming agents now used are essentially alkaline soaps which tend to reduce interfacial and surface tension of an aqueous vehicle, thereby causing the envelopment of air as bubbles. The reduction of interfacial tension causes wetting and penetration of the aqueous vehicle (water) into the refractory ingredients, a feature which is detrimental in the preparation and manufacture of refractory products.

It has been with this background in mind that the instant invention was conceived to solve the problem of the envelopment or entrainment of air in the form of individual spherical bubbles resulting in high even air dispersion in the form of discrete and individual cells which when fired become dead air cells. The approach to the problem was along a new path, in that the development of the entrained or entrapped air bubbles is done by the combination of a wetting agent and an added ingredient to control absorption and thus prevent the penetration of the water and wetting agent into the refractory material. The result was to reduce surface tension and yet prevent excessive absorption and penetration of the solution into the refractory material surrounding the bubbles.

The solution of the problem was through the development of an organic air cell forming and sustaining compound which may be prepared in the form of a liquid. Said organic compound is designed to function especially well in acid mineral compositions normally used to manufacture refractory products. The organic compound is mixed with the normal refractory filler materials and will cause air to be entrapped uniformly and sustained throughout the mass when mixed in a conventional mechanical mixer. The degree of air dispersion is governed by the percentage and composition of the organic compound used and the length of time of mixing employed. The volume of the mix when suitably mixed in a conventional mixer can be brought up to 3, 4, 5 or even more times the volume of the original slurry started with, and so give controlled air dispersion and volume of mix and thereby control density, insulating values and weight. The organic air cell forming and sustaining compound is highly volatile and thus disappears without appreciable residue on firing.

In the accompanying drawings:
FIG. 1 is a magnified view of the surface of a light weight refractory product; and
FIG. 2 is a flow diagram used in the making of refractory products.

The organic air cell forming and sustaining compound includes a wetting agent which has controlled wetting power, but said wetting power is controlled by the presence of an absorption control agent which, in addition to being a sustaining agent, acts to control the penetration of the water and wetting agent into the refractory material and thus control and insure the entrapment of air upon agitation. In the following disclosure the organic air cell forming and sustaining compound will be called a "cellmaker" for the sake of brevity and clarity.

Cellmaker

| | Percent |
|---|---|
| Alkanol HS | 15 |
| Gum ghatti | 15 |
| Water | 70 |
| Total | 100 |

Notes:

Alkanol HS is ethylene condensate of high molecular weight fatty alcohol.
Gum ghatti is a natural gum and may be secured from several sources.

This cellmaker is designed specifically for acid systems.
A good example of mineral composition suitable for making a light weight refractory product with a fine cell structure and by the use of binders other than the cements and which will resist high heat, is as follows:

Example

| | Percent |
|---|---|
| Calcined kyanite, 100 mesh | 31 |
| Calcined kyanite, 200 mesh | 35 |
| Hydrated alumina | 1.2 |
| 75% phosphoric acid | 7.2 |
| Mono-Line clay | 4.4 |
| Cellmaker | 6.0 |
| Water | 15.2 |
| | 100.0 |

The binder in the above example is formed by the reaction of hydrated alumina and phosphoric acid to form mono alumina ortho phosphate. This example is representative of the versatility of the process in which binders other than cement may be employed and still get satisfactory results. In this example, the Mono-Line clay is added to give additional support to the cellmaker for sustainment of the individual air cells after forming.

The main idea in developing light weight refractory products is to employ aggregates that are resistant to temperatures above those for which the ultimate product is intended. In the absence of available extremely light weight aggregates resistant to temperatures of from 2500° to 3000° F., it has been necessary to develop an intermediate aggregate weighing more than the intended product in order to compensate for the excessive weight of the binder and other materials essential to yield the desired product.

It is now possible to refer to FIG. 1 in which has been reproduced an enlarged view of the fact of a light weight refractory product made by the use of the cellmaker described herein. The air cells 10 are completely surrounded by the continuous film 11 of the air cell producing agent with the controlled wetting and penetration and which in addition sustains the air cells when dispersed in ceramic slurries. The remaining areas between the air cells 10 with their film 11 therearound contain the ceramic matrix with suitable aggregates and binders in an aqueous slurry.

In FIG. 2 is shown a flow diagram employed in making refractory products.

The refractory products that can be made as a result of this invention are all in the light weight category and run from 25 to 100 lbs. per cubic foot and will resist temperatures above 2500° F. without undergoing excessive distortion or shrinkage depending on the refractory materials employed. It is evident therefore that the invention disclosed herein is a distinct and new approach in the art of refractories.

In the use of an organic air cell forming and sustaining compound for the production of refractory products, it is proposed to thoroughly mix the organic compound with water and then thoroughly disperse the solution throughout the remaining dry refractory mass, the composition thus being completely mixed in slurry form ready for aeration, molding and firing. This preliminary mixing is desirable because of the small percentage of the cellmaker employed and insures a uniform dispersion of the discrete and individual dead air cells which are later produced during the slurrying and aerating operation. Moreover, the preliminary mix of the organic air cell forming and sustaining compound could be supplied as a commercial composition.

What is claimed is:

1. A process for the production of light weight high temperature acid refractory products of high insulating value, comprising the steps of first mixing with water an organic air cell forming and sustaining compound to produce a solution, then mixing said solution with a high temperature acid refractory material to produce an aqueous slurry, agitating said slurry by mechanical means for a sufficient period of time to create a multitude of separate and discrete air cells uniformly distributed throughout the mixture for a desired increase in volume, said organic air cell forming and sustaining compound consisting essentially of an amine type of wetting agent which controls the formation and distribution of the multitude of separate and discrete air cells and an absorption-control agent which sustains the separate and discrete air cells and which prevents the penetration of the water and the wetting agent into the refractory material, and finally converting the mixture by forming and firing into end products free of contamination by completely volatilizing during firing the wetting agent and the absorption-control agent making up the organic air cell forming and sustaining compound, characterized in that the organic air cell forming and sustaining compound when mixed with said acid refractory material consists of 15% by weight of ethylene condensate of high molecular weight fatty alcohol and 15% by weight of gum ghatti mixed with 70% by weight of water.

2. A process for the production of light weight acid refractory products according to claim 1 wherein the organic air cell forming and sustaining compound comprises approximately 6% by weight of the total mixture before firing.

References Cited by the Examiner

UNITED STATES PATENTS 3,052,949  9/62  Williams et al. _____ 264—43 XR

FOREIGN PATENTS 584,349  10/59  Canada.
539,022  8/41  Great Britain.
648,299  1/51  Great Britain.
756,672  9/56  Great Britain.

ROBERT F. WHITE, *Primary Examiner.*

ALEXANDER H. BRODMERKEL, *Examiner.*